US005713704A

United States Patent [19]

Pommier et al.

[11] Patent Number: 5,713,704

[45] Date of Patent: Feb. 3, 1998

[54] DEVICE FOR SECURING A WHEELCHAIR

[75] Inventors: Claude Pommier, La Jarne; Patrick Ricaud, Perigny, both of France

[73] Assignee: GEC Alsthom Transport SA, Paris, France

[21] Appl. No.: 661,796

[22] Filed: Jun. 13, 1996

[30] Foreign Application Priority Data

Jun. 14, 1995 [FR] France .................. 95 07071

[51] Int. Cl.$^{6}$ .................. B60P 3/06

[52] U.S. Cl. .................. 410/9; 410/30; 188/2 F; 188/32; 414/921

[58] Field of Search .................. 188/2 F, 32, 4 R; 410/19, 30, 49; 414/921, 401, 537

[56] References Cited

U.S. PATENT DOCUMENTS

| | | | |
|---|---|---|---|
| 2,562,035 | 7/1951 | Hileman | 188/32 |
| 2,585,126 | 2/1952 | Holland | 188/32 |
| 3,425,517 | 2/1969 | Speir | 188/32 |
| 3,628,466 | 12/1971 | Lyons | 410/49 X |
| 4,027,747 | 6/1977 | Moorman, Jr. . | |
| 5,388,937 | 2/1995 | Farsai | 188/32 |

FOREIGN PATENT DOCUMENTS

| | | | |
|---|---|---|---|
| 487145 | 5/1992 | European Pat. Off. | 410/49 |
| 40 13 187 A1 | 10/1990 | Germany . | |

*Primary Examiner*—Peter M. Poon
*Attorney, Agent, or Firm*—Sughrue, Mion, Zinn, Macpeak & Seas, PLLC

[57] ABSTRACT

An integrated device for securing a wheelchair in a position on a floor is formed of a frame-like box for mounting beneath the floor and within an opening therein. The box mounts for rotation about parallel horizontal axes, a pair of laterally spaced, horizontally extending parallel flaps which are rotatable from a position flush with a pair of openings within a horizontal floor plate receiving the flaps to raised, oppositely oblique positions forming a V. A vertically upright cover extends from one end of the floor plate and mounts a pair of push button controls on an upper surface. A vertically upright actuator is fixedly mounted to a face of the upright cover and has a projectable and re tractable plunger coupled to a flap locking member which carries an axial projection projectable into an axial bore of a retaining cylinder fixedly mounted to the box. Wings to opposite sides of the flap locking member couple via connecting rods to respective pivotable rocker arms which fixedly mount rocker arm drive rods fixed to the hinged flaps for rotating the flaps in opposite directions. The connecting rods move into axial alignment, thereby ensuring force take-up by the flap locking member, with the flaps in oblique raised position. A vertically upright channel guide member receives a flap locking member having a slide fitted to a channel guide member allowing forces developed on the hinged flaps to be taken up by the channel guide member during opening and closing of the flaps.

5 Claims, 4 Drawing Sheets

DEVICE FOR SECURING A WHEELCHAIR

The present invention relates generally to devices for transporting patients or persons with reduced mobility, and it relates more particularly to a device for securing a wheelchair.

BACKGROUND OF THE INVENTION

U.S. Pat. No. 3,955,847 discloses a device for securing a wheelchair, which device includes firstly two grooved rails, each of which is suitable for receiving either one of the two wheels of a wheelchair, and secondly means for fixing a crossbar retaining the two wheels in their respective grooved rails.

U.S. Pat. No. 3,937,376 also discloses a device for securing a wheelchair, which device includes means for chocking the front and the rear of each of the two wheels of the wheelchair.

The devices described in both of those documents are based on implementing means serving to chock directly the front and the rear of each of the two wheels of the wheelchair.

OBJECTS AND SUMMARY OF THE INVENTION

An object of the invention is to provide a device for securing a wheelchair, which device is adaptable to all existing standards.

The structure and the implementation of the device for securing a wheelchair as proposed by the Applicant differ from known state-of-the-art structures and implementations.

The invention provides a device for securing a wheelchair, said device having chocking means for chocking the front and the rear of at least one of the wheels of said wheelchair, said chocking means being composed of two hinged flaps, one of which can be positioned at the front of said wheel of said wheelchair and the other at the rear of said wheel.

The device of the invention for securing a wheelchair also has at least one of the following characteristics:

when said device is installed in the floor of a vehicle, the two hinged flaps are integrated in the thickness of said floor;

one of the two flaps may be a fixed flap;

control means for controlling said hinged flaps are disposed so as to be accessible to the occupant of the wheelchair;

locking means co-operate with retaining means for retaining said locking means to take up forces applied to one and/or the other of said hinged flaps when said hinged flaps are in the occupied position;

guide means co-operate with said locking means, said locking means sliding in said guide means and being guided by said guide means until said locking means are retained in said retaining means, said guide means taking up forces applied to both of said hinged flaps while said hinged flaps are being raised or lowered.

An advantage of the device of the invention for securing a wheelchair is that the passenger is autonomous in the passenger car.

Another advantage of the device of the invention for securing a wheelchair is that the device of the invention does not obstruct the passageway in the passenger car when it is vacant.

Another advantage of the device of the invention for securing a wheelchair is that the device can be used under more extreme conditions, namely: emergency braking, and transverse and longitudinal acceleration.

Another advantage of the device of the invention for securing a wheelchair is that the device is made in one separate assembly, thereby facilitating installation of the device.

Another advantage of the device of the invention for securing a wheelchair is that the device fits readily into the surroundings.

BRIEF DESCRIPTION OF THE DRAWINGS

Other objects, characteristics, and advantages of the invention appear on reading the following description of a preferred embodiment of the device for securing a wheelchair, given with reference to the accompanying drawings, in which.

MORE DETAILED DESCRIPTION

Figure 1:
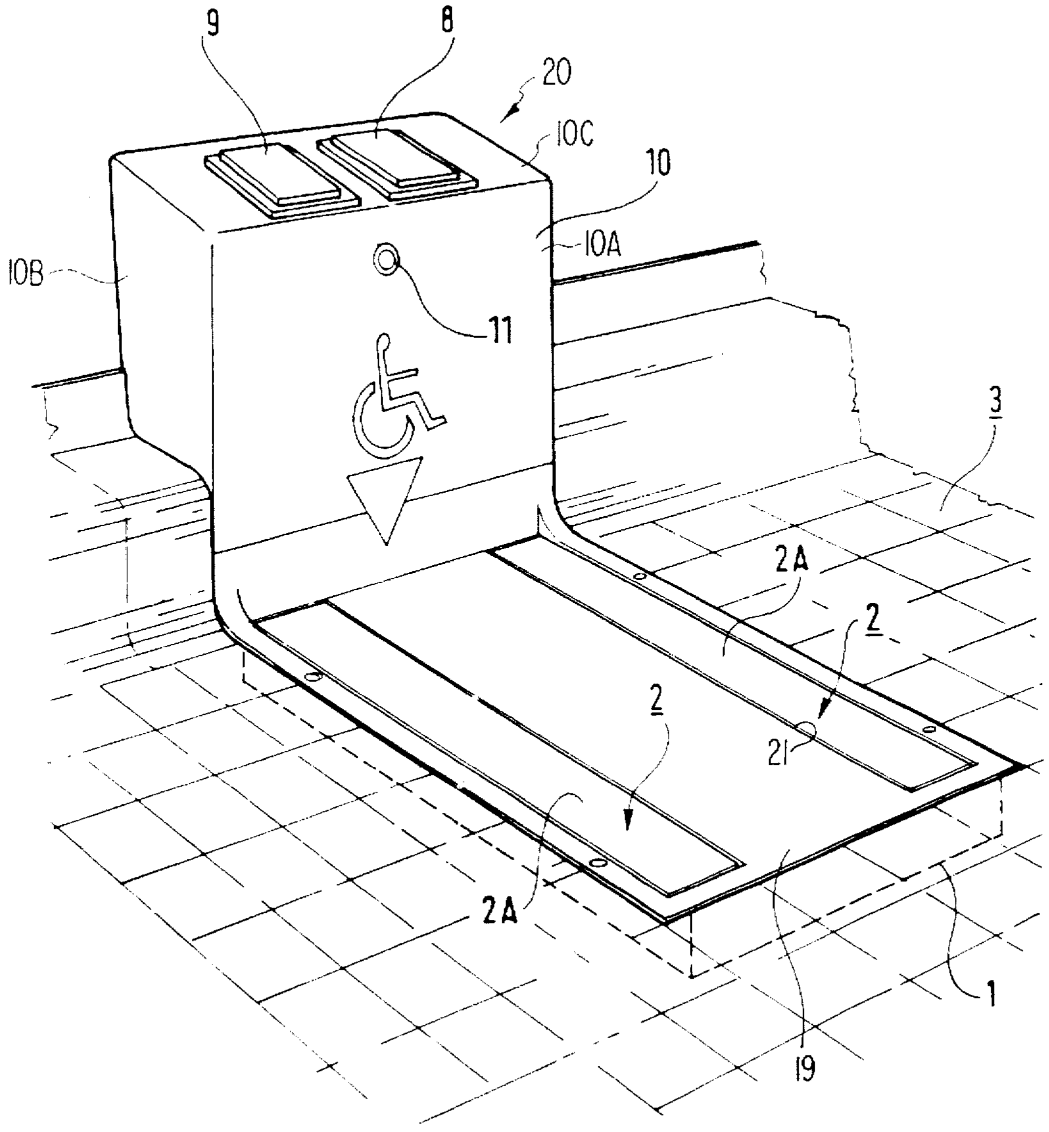
FIG. 1 is a perspective view of the device of the invention for securing a wheelchair, the device being shown in the wheelchair vacant position.
Figure 2:
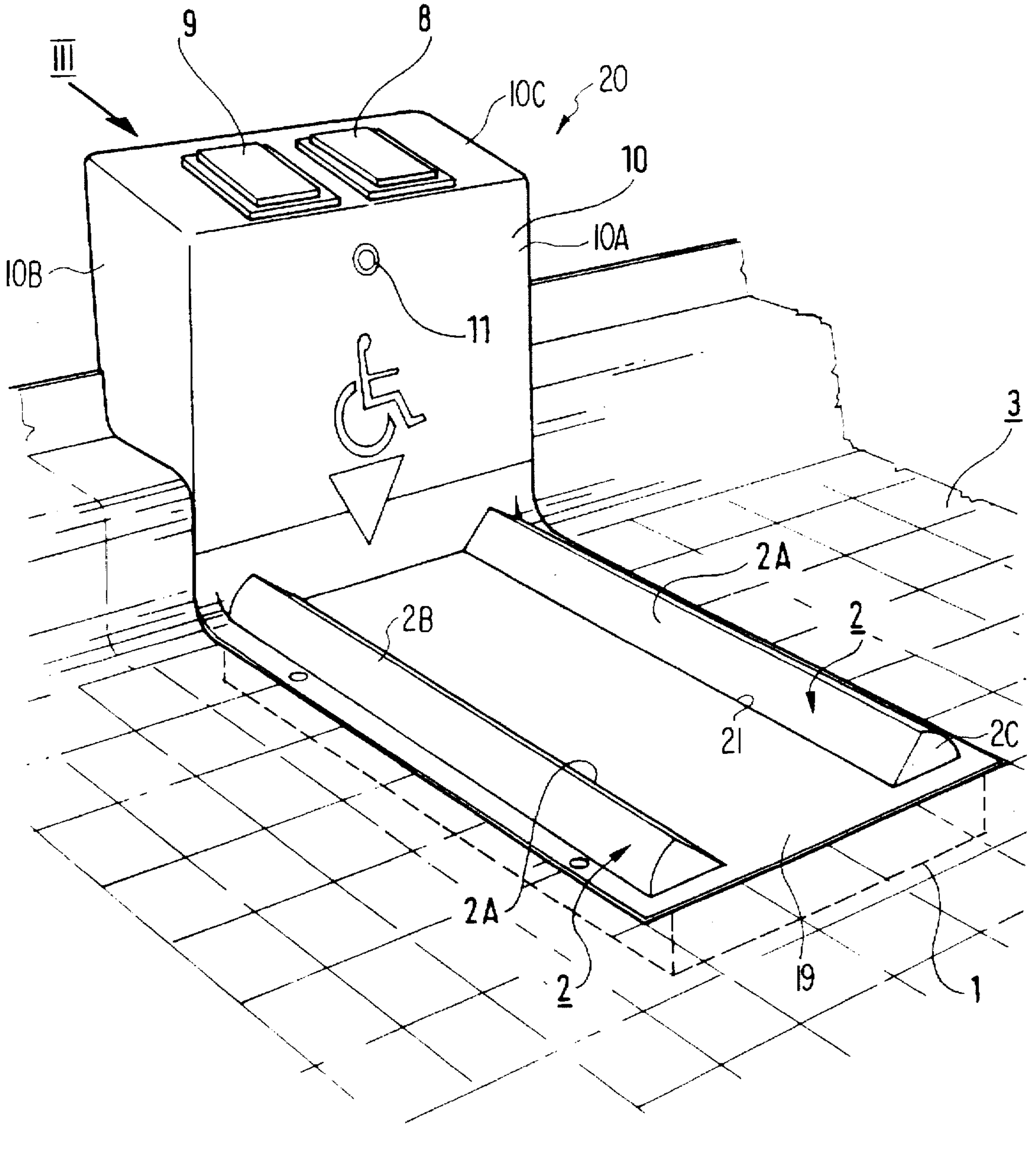
FIG. 2 reproduces the FIG. 1 perspective view when the device of the invention for securing a wheelchair is in the occupied position.

FIGS. 1 and 2 are perspective views of the device of the invention for securing a wheelchair.

The device of the invention for securing a wheelchair may be installed in a floor 3, e.g. a floor of a passenger car of a rail or road vehicle, or a floor of an aircraft or of a boat.

The device of the invention for securing a wheelchair is also adapted to operating as a moving stairway, e.g. in a private home or in a public or private building.

The device of the invention for securing a wheelchair is composed of mechanical means integrated in the thickness of the floor, and of control means for controlling the mechanical means, which control means are also integrated, and are accessible to the occupant of the wheelchair.

In the embodiment shown in FIGS. 1 and 2, the integrated mechanical means of the device of the invention for securing a wheelchair (not shown) are composed of two hinged flaps 2 disposed in a box 1, the resulting assembly being integrated in the thickness of the floor 3 of the vehicle. Box 1 is covered by a floor plate 19.

Each of the two hinged flaps 2 includes a moving flat wall 2A integral with an arcuate wall 2B of the same length and joined to sector shaped end walls 2C at opposite ends and mounted to pivot about the base of the hinged flap in question within rectangular openings 21 of floor plate 19.

The moving flat walls of the hinged flaps are disposed parallel to each other and to the floor.

Figure 3:
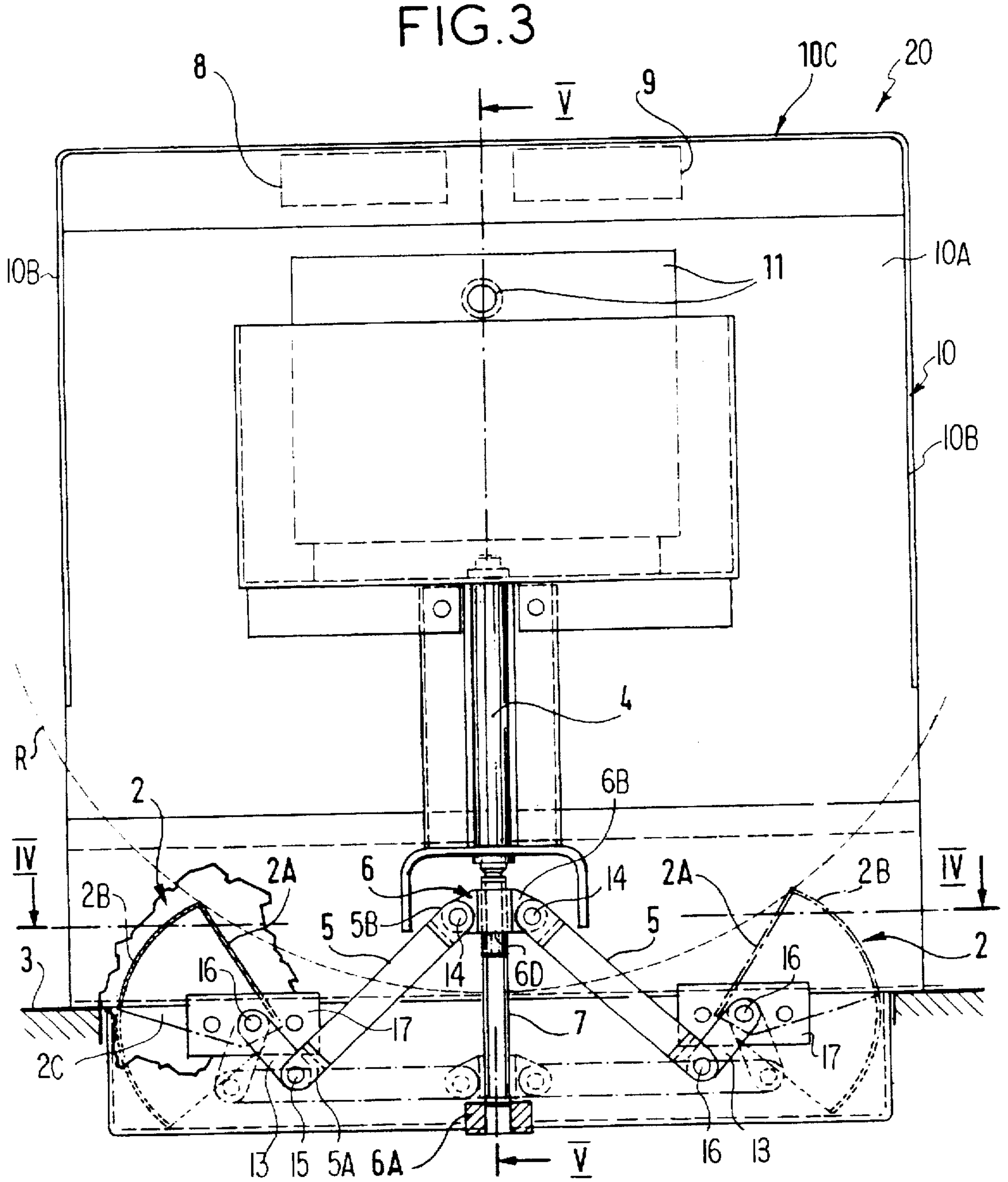
FIG. 3 shows an end view of a preferred embodiment of the control means for controlling the hinged flaps.

The two hinged flaps 2 serve to secure the main wheels R of the wheelchair by the moving flat walls 2A of the two hinged flaps 2 being positioned respectively in front of and behind the main wheels of the wheelchair, the moving walls then forming a V, FIG. 3.

The wheelchair is secured once it has been placed between the two hinged flaps and after the two hinged flaps have been actuated.

In other words, in the vacant position (see FIG. 1), the two hinged flaps are flush with the floor, whereas, in the occupied position (see FIG. 2), the two hinged flaps form obstacles above the floor that are sufficient to prevent the wheelchair from being displaced during maximum acceleration, in particular during emergency braking.

In the embodiment shown in FIGS. 1 and 2, the control means for controlling the integrated mechanical means indicated at 25, FIG. 3 include two push buttons 8, 9 preferably disposed on the top of a cover 10 so as to be accessible to the occupant of the wheelchair.

For example, the control means for controlling the integrated mechanical means may be mechanical, electrical, pneumatic, or hydraulic.

Locking means 11 for locking the control means for controlling the integrated mechanical means 25 may be used to prevent the control means from being used to control the integrated mechanical means when no wheelchair is placed between the two hinged flaps.

For example, the control means of the device for securing a wheelchair may be unlocked by means of a guard's service key, unlocking locking means 11.

FIG. 3 shows an end view of a preferred embodiment of the control means for controlling the hinged flaps.

Figure 4:
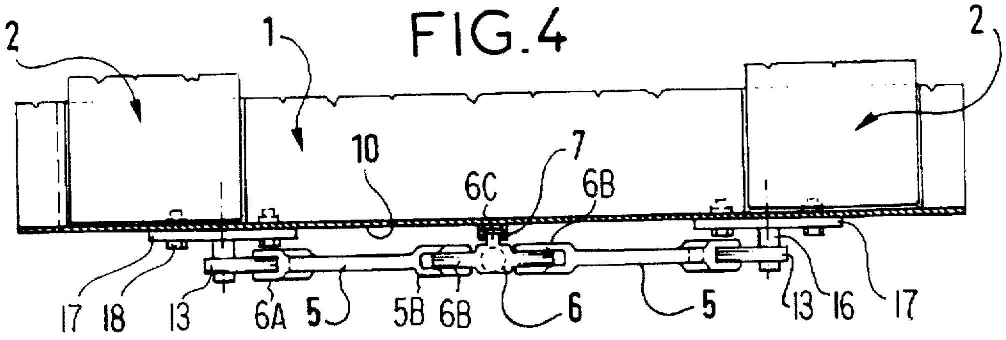
FIGS. 4 and 5 are views partially in section of the control means shown in FIG. 3 for controlling the hinged flaps.
Figure 5:
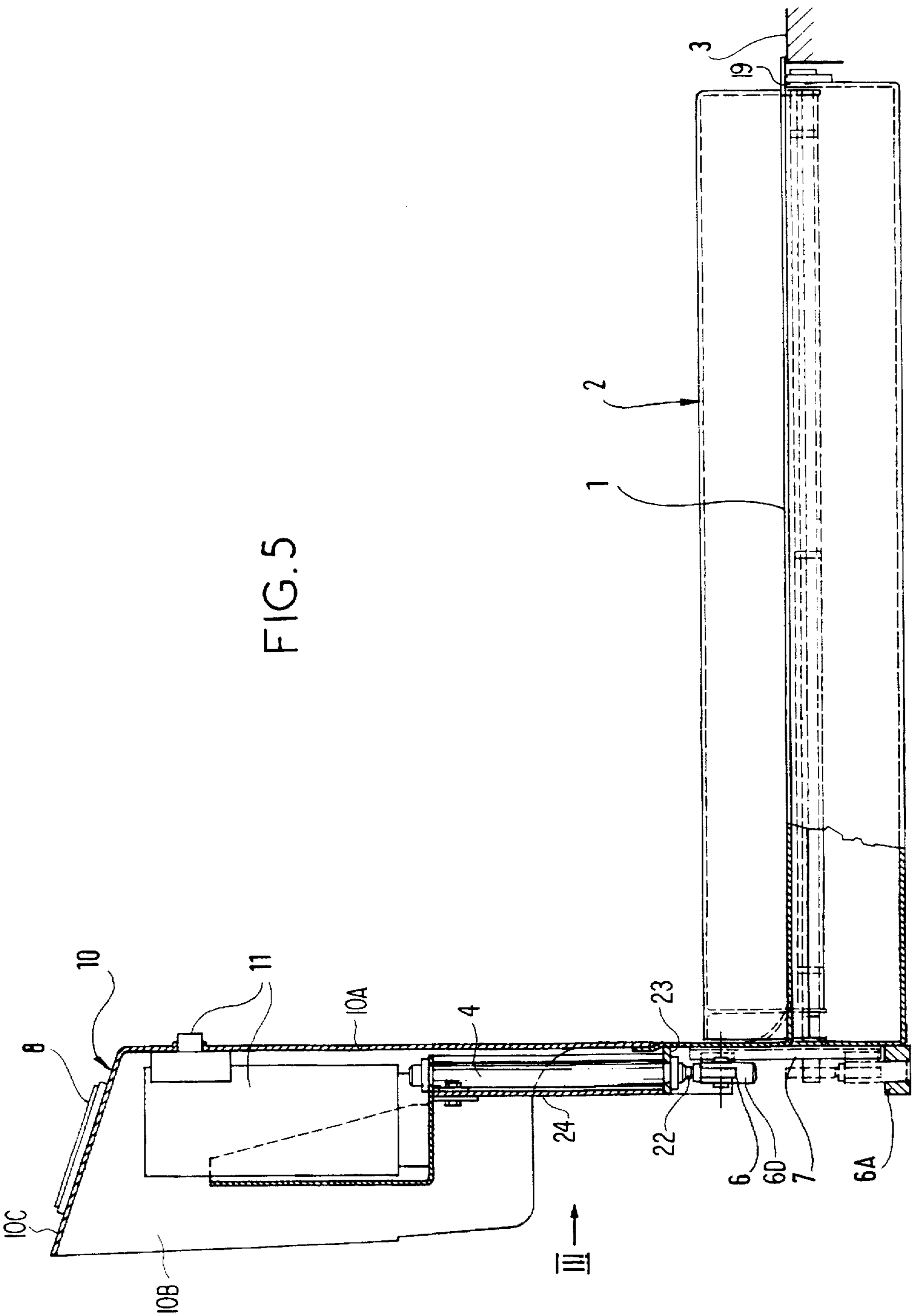

FIG. 3 is supplemented by FIGS. 4 and 5 which are views partially in section of the control means for controlling the hinged flaps.

FIGS. 3 to 5 also show the box 1 and the hinged flaps 2.

The hinged flaps are actuated by actuating means via transmission means for transmitting the force produced by the actuating means.

For example, the actuating means may be composed of an actuator 4. Actuator 4 may be a single acting hydraulic or pneumatic actuator such as that of U.S. Pat. No. 5,388,937.

For example, the transmission means may be in part connecting rods 5.

For example, the actuator 4 may be a pneumatic actuator.

The actuator 4 is disposed vertically relative to the floor 3 of the vehicle.

The hinged flaps 2 are disposed on either side of centered actuator 4 and are united with one end of the actuator by means of the connecting rods 5 and rocker arms 13.

A channel-section guide member 7 is fixed to the rear of front wall 10A of a vertically upright cover indicated generally at 10, FIG. 3, and receives a projection or slide 6C of a flap locking member or locking means 6 from which diametrically opposite wings or arms 6B project. The slide 6C is received within the channel-section guide member 7 so that the slide is limited to movement longitudinally within the U-shaped channel-section guide member. Each connecting rod 5 has clevises 5A, 5B at respective opposite ends. Pivot pins 14 pivotably pivot clevises 5B to respective wings 6B. In turn, each clevis at 5A at the opposite end of the connecting rods is pivotably connected to rocker arms 13 by pivot pins 15, FIGS. 3, 4. The opposite ends of the rocker arms are fixedly coupled to rocker arm drive rods 16 which are rotatably mounted by rocker arm mounting plates 17 fixed to the rear of front wall 10A by nut and bolt assemblies or the like 18. The drive rods 16 extend the full length of the box 1, FIG. 5, and are rigidly mounted to flaps 2 such that the flaps are rotatable from positions in which the flat walls 2A lie flush within rectangular slots or openings 21 within floor plate 19, as per FIG. 1, to upward, oppositely oblique positions as shown in FIG. 2. In changing positions from FIGS. 1 to 2, the flap locking member 6 moves from its full line position in FIG. 3 to dotted line position, in which case the connecting rods 5 shift from oblique to longitudinally aligned, horizontal dotted line positions of that figure. The length of the connecting rods 5 and the rocker arms 13 are such that the travel of plunger 22 of actuator 4 is of a stroke sufficient to raise the flat flap walls 2A from horizontal to inclined positions, FIG. 3, well above the surface of the floor plate 19 as further shown in FIG. 2.

The hinged flaps 2 are locked in the wheelchair occupied position by means of flap locking means 6D in the form of a cylindrical projection 6D of the flap locking member 6. The projection 6D below wings 6B enters a center hole 26 of the retaining means 6A with the wings 6B abutting the top of the retaining means. The locking means 6D serves to take up the forces applied to one and/or the other of the hinged flaps when the hinged flaps are in the occupied position, principally while the vehicle is moving, or while the moving stairway is operating.

For this purpose, the locking means projection 6D co-operate with retaining means 6A for retaining the locking means 6D.

The retaining means 6A are preferably cylindrical, they are disposed in alignment with the actuator 4 and with the locking means 6, and they are fixed at the bottom of the box 1.

When the locking device is in the occupied position, the locking means 6D are in the low position and are retained at least in part by the retaining means 6A.

Channel-section guide means 7 are disposed parallel to the actuator 4.

The guide means 7 co-operate with the slide 6C of locking means 6D in that the slide 6C slides the guide means 7 so as to be guided thereby until the locking means projection 6D penetrates and is retained in the retaining means 6A.

The guide means 7 serve to take up the forces applied to either one of the hinged flaps 2 while the hinged flaps are being raised or lowered.

In another embodiment (not shown), the device of the invention for securing a wheelchair may include one fixed flap and one hinged flap.

The fixed flap then forms an obstacle above the floor that is sufficient to prevent the wheelchair from being displaced beyond the fixed flap.

The wheelchair can then abut against the fixed flap, the hinged flap then being retracted into the thickness of the floor.

The hinged flap is then controlled as described above.

The main wheels of the wheelchair are first partially secured by a fixed flat wall of the fixed flap and then by the moving flat wall of the other hinged flap being positioned respectively either in front of or behind the main wheels of the wheelchair, the walls then forming a V.

Clearly, the walls of a hinged flap and of the fixed flap preferably form a V when the flaps are in the occupied position. But this is not necessarily the case.

Finally, the wheel contact walls of the flaps may be plane, convex, or concave, and, for example, they may be made of embossed stainless steel so as to be non-slip.

We claim:

1. A securing device for securing at least one wheel of a wheelchair on an underlying floor, said device comprising means for pivotably mounting a pair of laterally spaced hinged flaps extending parallel to each other within a floor for movement of one wall thereof from a first position wherein said one wall is flush with the floor to second, oppositely upwardly inclined positions on opposite sides of the wheelchair wheel, a fixed actuator, centered between said flaps and remote therefrom, said actuator including a reciprocating plunger projectable between retracted and projected positions, a locking means carried by said reciprocating plunger on a projected end thereof, a pair of connecting rods hinged to diametrically opposed sides of said locking means at one end thereof, rocker arms pivotably coupled to respective opposite ends of said connecting rods, said rocker arms having fixed thereto at opposite ends thereof rocker arm drive rods projecting parallel to and being fixedly coupled to said flaps for rotating said flaps about pivot axes of said respective drive rods in opposite directions of rotation, and retaining means fixedly positioned in the path of movement of said flap locking means aligned therewith and acting to receive said locking means, and wherein said connecting rods and said rocker arms are of lengths correlated to the stroke of said plunger, such that said connecting rods are in opposite oblique positions, with said flaps in said first position and said locking means remote from said retaining means, and wherein said connecting rods are moved into axially aligned positions, with said plunger fully projected, and said locking means is received within said retaining means such that forces applied to said hinged flaps are taken up by said locking means and said fixed retaining means.

2. The securing device as claimed in claim 1, further comprising longitudinally extending guide means fixedly mounted proximate to and parallel with said reciprocating plunger, intermediate of said actuator and said hinged flaps, and wherein said locking means comprises a slide integral therewith and operatively slidably engaging said guide means such that during disengagement of said locking means with said retaining means said guide means takes up forces applied to one or both of said hinged flaps while said hinged flaps are being raised from said floor or lowered thereto.

3. The securing device as claimed in claim 2, wherein said device further comprises a box, a floor plate overlying said box, said box being mounted beneath said floor and within an opening therein, an upright cover fixed to one side of said box, said actuator being mounted vertically to a face of said cover at a level above said floor plate, said guide means being mounted vertically to said upright cover beneath said actuator and being axially aligned therewith, said box includes a bottom wall, and said retaining means being mounted to the bottom wall of said box facing said locking means and positioned to receive an end of said locking means.

4. The securing device as claimed in claim 3, wherein said retaining means comprises a hollow cylindrical member, said locking means comprises an axial projection at one end of said locking means remote from said plunger and being sized to the bore of said hollow cylindrical retaining means and slidably receivable therein.

5. The securing device as claimed in claim 3, wherein said vertically upright cover includes control means for controlling said actuator, and said control means comprises push buttons mounted on said cover and accessible to a wheelchair occupant, and wherein said upright cover further comprises control locking means proximate to said push buttons.

* * * * *